United States Patent [19]

Tybus et al.

[11] 4,033,021
[45] July 5, 1977

[54] GAS SEPARATION NOZZLES AND METHOD AND APPARATUS FOR PRODUCING SUCH NOZZLES

[75] Inventors: Gerd Tybus, Poing; Ludwig Ebner, Poering; Rudolf Waldhöer, Feldkirchen; Peter Bichler, Schondorf; Wilhelm Bier, Leopoldshafen; Peter Happe, Eggenstein; Frowald Weis, Karlsruhe, all of Germany

[73] Assignees: Messerschmitt-Bolkow-Blohm GmbH, Munich; Gesellschaft fur Kernforschung m.b.H., Karlsruhe, both of Germany

[22] Filed: Apr. 15, 1975

[21] Appl. No.: 568,301

[30] Foreign Application Priority Data

Apr. 20, 1974 Germany .......................... 2419192

[52] U.S. Cl. ...................... 29/157 C; 29/DIG. 26; 239/589; 55/17; 90/24 F; 90/24 D
[51] Int. Cl.² ................... B23P 15/00; B23P 13/00
[58] Field of Search .......... 29/157 C, DIG. 26, 557; 239/589, 600; 55/17; 90/24 R, 24 F, 24 D, 24 A; 144/108, 115, 124, 120

[56] References Cited

UNITED STATES PATENTS

| 2,744,451 | 5/1956 | Lee | 90/24 |
|---|---|---|---|
| 3,172,331 | 3/1965 | Nole et al. | 90/24 |
| 3,362,131 | 1/1968 | Becker | 55/17 |
| 3,708,964 | 1/1973 | Becker et al. | 55/17 |
| 3,733,962 | 5/1973 | Persson | 90/24 F |
| 3,865,012 | 2/1975 | Laigle et al. | 90/24 F |

FOREIGN PATENTS OR APPLICATIONS

1,292,286  3/1962  France ........................... 144/120

*Primary Examiner*—C.W. Lanham
*Assistant Examiner*—Daniel C. Crane
*Attorney, Agent, or Firm*—W. G. Fasse; W. W. Roberts

[57] ABSTRACT

Gas separation nozzles are produced by machining the nozzle parts, such as a holding body and separation elements by moving sectional material, for example, prefabricated sectional steel or aluminum alloy rods through a high precision sliding guide path past a shaving tool, whereby the workpiece is pressed against supporting and retaining surfaces of the guide path at least at three points and a shaving tool is applied to the moving workpiece in an area defined by said three points so that the tool is effective as close as possible to the pressure applying points or areas. At least two separation elements are supported in a dovetail groove of a holding body so that nozzle edges of the elements extend into a gas deflection groove in the holding body. Where four separation elements are held in a common dovetail groove of the holding body, two of the four elements are provided with a gas deflection groove extending along its respective nozzle edge. The arrangement is such that the nozzle edges of one pair of separation elements extend into the gas deflection groove of the other pair and vice versa. The holding body may be provided with assembly means such as further dovetail grooves and tongues for assembling a plurality of such separation nozzles into an integral structure.

11 Claims, 6 Drawing Figures

GAS SEPARATION NOZZLES AND METHOD AND APPARATUS FOR PRODUCING SUCH NOZZLES

BACKGROUND OF THE INVENTION

The present invention relates to gas separation nozzles and to a method and apparatus for producing such nozzles. Gas separation nozzles are employed for separating gases or vapors having different molecular weights from each other, especially for separating isotopes from each other with the aid of sectional rods forming separation elements having projecting nozzle lips or edges. Stainless sectional steel or aluminum alloys may, for example, be employed for the production of the nozzle parts, especially the separation elements.

Separation nozzles of the just described type are useful, for example, for performing a method as described by Dr. E. W. Becker et al. in Paper 383 presented at the Fourth International Conference of the United Nations regarding the peaceful exploitation of nuclear energy at Geneva in 1971. The separation of gases and isotopes may be accomplished by means of centrifuges as well as with the aid of separation nozzles. The latter have the great advantage that the separation is accomplished with substantially stationary plants or equipment. However, such plants of a technically useful size, for example, uranium accumulation plants require a total separation nozzle length in the order of about 1,000 km and even more. German patent publications Nos. 1,794,274; 1,198,328 and 1,951,639 as well as German Pat. No. 1,908,693 describe methods for the production of separation nozzles of the type required in this context.

In order to assure a good efficiency factor of a separation nozzle plant, it is necessary to maintain a given nozzle geometry over the entire length of the separation nozzles. Such nozzle geometry must in fact be maintained with the highest precision, whereby the permissible tolerances may in certain instances not exceed about 0.001 mm. It has been found that prior art methods for producing separation nozzle elements are capable of achieving a comparable quality for such elements, however, at a substantially higher production effort and cost so that prior art methods are economically not feasible.

OBJECTS OF THE INVENTION

In view of the above, it is the aim of the invention to achieve the following objects singly or in combination:

to provide a method for the production, especially the machining of prefabricated sectional rod material to form high precision elements with tolerances smaller than $\pm 1\mu$;

to form in a rational and economical manner separation nozzle elements suitable for assembly to form a total nozzle length of several thousand kilometers;

to produce with the mentioned high precision section nozzle elements having an individual length of about 50 to 100 centimeters so as to facilitate their handling;

to construct such nozzle elements in such a manner that they will be effective for the separation purpose along their entire length by avoiding supporting means in the active nozzle area;

to provide a machining method which will permit the removal of this material layers in the order of about 0.001 millimeters in an economical manner;

to shape the separation elements in such a manner that the nozzle edges may reach into a deflection groove either in the holding body or into a deflection groove in another separation element; and to provide a machining apparatus for the production of high precision separation elements while simultaneously obviating the need for very expensive precision milling machines.

SUMMARY OF THE INVENTION

According to the invention there is provided a method for the production of gas separation nozzles for separating gas or vapor materials having different molecular weights from each other, especially for separating isotopes by employing sectional rods for the nozzle lips which form the separation apertures also referred to as "skinning" apertures, whereby the sectional rods, for example, of stainless steel or aluminum alloys, are moved along a highly precise sliding path for the further machining, said movement being accomplished, for example, by pulling and whereby the workpiece is pressed against the gliding path from two sides by workpiece presser means, which are arranged as close as possible to a shaving type material removing cutting tool, which in turn is adjustable in a direction extending substantially perpendicularly relative to the direction of movement of a workpiece. In a practical embodiment according to the invention the shaving tools are provided with diamond cutting tips or cutting edges and several of such "shaving knives" are spaced from each other, for example, at spacings of about 25 millimeters. The spacing between each cutting edge and the workpiece becomes progressively smaller.

In view of the above it will be understood that the term "shaving, material removing cutting" is intended to mean a machining operation in which material is removed from a workpiece by means of a tool and if desired by means of several tools or so called shaving knives arranged in a tool support adjustable to a fixed position relative to a sliding path along which the workpiece is pulled for shaving contact with the tool or tools while simultaneously pressing the workpiece against the sliding guide. It has been found that in this manner very thin layers having a thickness of about 0.001 mm may be removed. Another advantage of the invention is seen in that it permits the machining of large lengths of sectional rods in a short time by relatively economical machining equipment and with tolerances in the order of $\pm 1\ \mu$ or less. This type of machining may be especially facilitated by providing a temperature controlled lubrication and by suitably controlling the cutting speed by regulating the feed advance of the workpiece. The cutting edges of the tool or tools will also be suitably shaped in accordance with the particular shape of the separation elements being machined.

Experiments have shown that the precision which can be achieved by the method and apparatus of the invention could not be obtained by employing comparable prior art technologies. A prior art method in which sectional rods are pulled through a drawing die resulted in a product having too high dimensional tolerances. This was also true where rods were guided past contoured broaching tools. However, rods which have been prefabricated by a drawing process are suitable for further machining according to the invention. Even very expensive prior art precision milling machines could not constantly maintain the required tolerances over partial lengths of at least 50 cm and at a relatively low working speed.

BRIEF FIGURE DESCRIPTION

In order that the invention may be more clearly understood, it will now be described, by way of example, with reference to the accompanying drawings, wherein.

DETAILED DESCRIPTION OF EXAMPLE EMBODIMENTS

Figure 1:
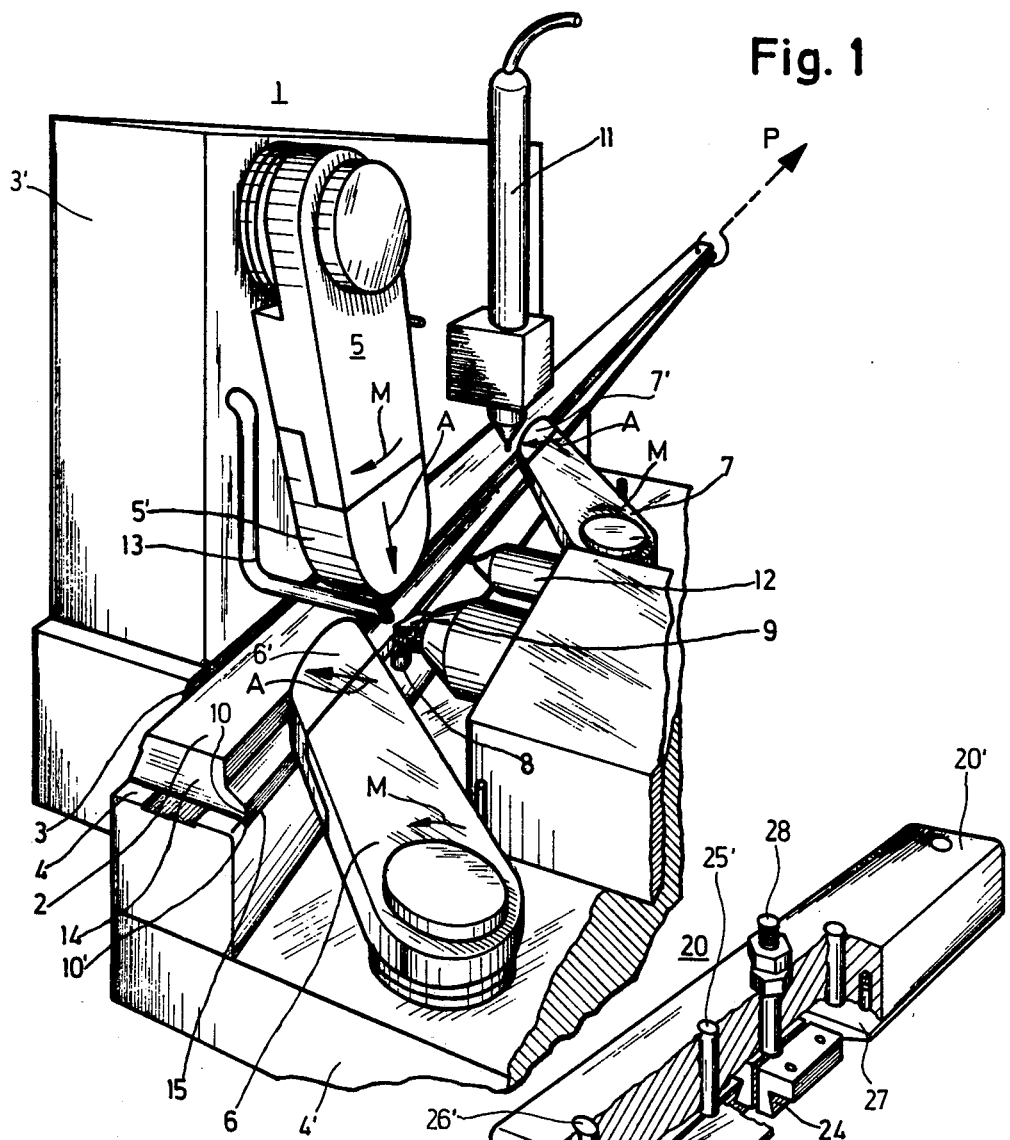
FIG. 1 illustrates an apparatus for the machining of sectional rods provided with separation lips.

FIG. 1 illustrates in a schematic, simplified manner an apparatus 1 according to the invention for subjecting prefabricated sectional rods or workpieces 2 to a high precision machining operation for making rod shaped separation elements to be employed in separation nozzles, whereby the use of relatively low cost tool means achieves the tolerance of less than 1 $\mu$ which are necessary for the production of separation nozzles and whereby such close tolerances are accomplished in comparably short worktimes at substantially lower costs than heretofore. Pulling means, for example, a piston cylinder arrangement not shown but effective with a force P are connected to the forward end of the workpiece 2 for pulling the workpiece along a high precision gliding path comprising a substantially horizontally extending supporting surface 4 for the workpiece and a second workpiece retaining surface 3 extending at an angle relative to the horizontal surface 4. The angle of inclination between the surfaces 3 and 4 will be selected with due regard to the dove-tail shape which the workpiece is intended to have. The supporting surfaces 3 and 4 form part of a frame structure 3' and 4' respectively. A first presser means 5 is journaled to the frame member 3' to extend substantially in a vertical plane. The first presser means 5 comprise an arm with a removable and thus exchangeable free end 5' secured to the arm by screws or the like, not shown for simplicity's sake. Motor means for example, supported inside the frame member 3' apply a torque moment to the presser arm 5 in the direction of the arrow M. Thus, a pressure represented by the arrow A is effective on the workpiece 2.

Second presser means comprising a presser arm 6 with a free end 6' and a further presser arm 7 with a free end 7' are journaled to the frame member 4'. Power drive means are again provided inside the frame member to apply a torque moment M to these presser members or arms 6 and 7. These arms 6, 7 are effective substantially in a horizontal plane and the applied torque moment results in a pressure, again indicated by the arrow A, urging the workpiece against the retaining surface 3.

The presser members 6, 7 are spaced from each other just enough to permit the locating of a tool 9 for the removal of material shavings 8. The close spacing of the just described elements relative to each other assures a support for the workpiece which permits the application of the tool at a point close to the areas of pressure application to the workpiece, whereby the latter is securely held and vibrations are avoided. Incidentally, the tool 9 may also be supported on the frame member 4' and is adjustable in a conventional manner in a direction extending perpendicularly to the direction of movement of the workpiece 2.

Figure 4:
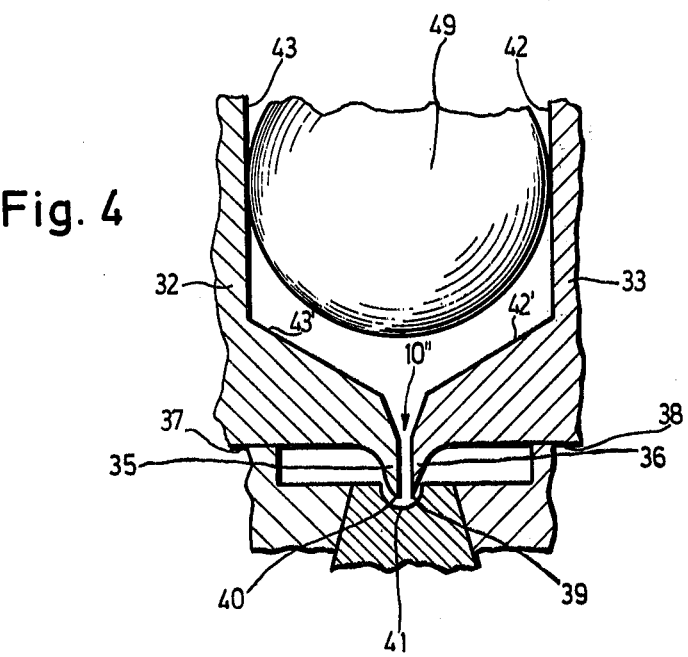
FIG. 4 is a sectional view on an enlarged scale through the nozzle of FIG. 3.

FIG. 1 illustrates the machining of a workpiece 2 along a lip 10 to form a surface 10' which in conjunction with another separation element of mirror symmetrical shape will form a separation aperture 10'' as best seen in FIG. 4. The lip 10 is provided with a nozzle edge 15 extending downwardly. Measuring sensors 11 and 12 are arranged downstream of the tool 9 as shown in FIG. 1 and as viewed in the feed advance direction of the workpiece 2. These sensors 11 and 12 control a continuous adjustment of the tool in a manner well known in the art.

Temperature controlled lubrication means 13 also well known in the art may be arranged to lubricate the point of contact between the workpiece 2 and the tool 9. Any well known lubricating liquids could also be suitable for the present purposes.

The workpieces 2 are preferably sectional rods having a prefabricated trapezoidal cross section 14. The downwardly extending lip 10 is advantageously arranged to project from the largest surface of the trapezoid, whereby it is possible to use the apparatus according to the invention as shown in FIG. 1 for a precise machining of the workpiece and thus to maintain the nozzle geometry of the sectional rods, especially in the area of the lip 10 and the surface 10' which will form a wall of the separation aperture 10'' and also adjacent to the nozzle edge 15 thereby maintaining tolerance below 1 $\mu$.

Figure 2:
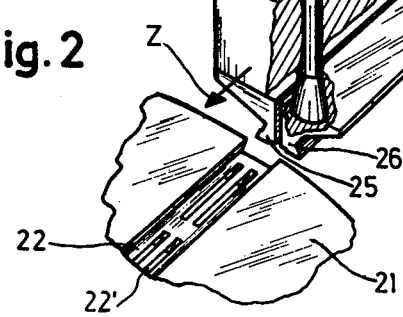
FIG. 2 is an apparatus for machining a dovetail groove into a holding body for a separation nozzle.
Figure 3:
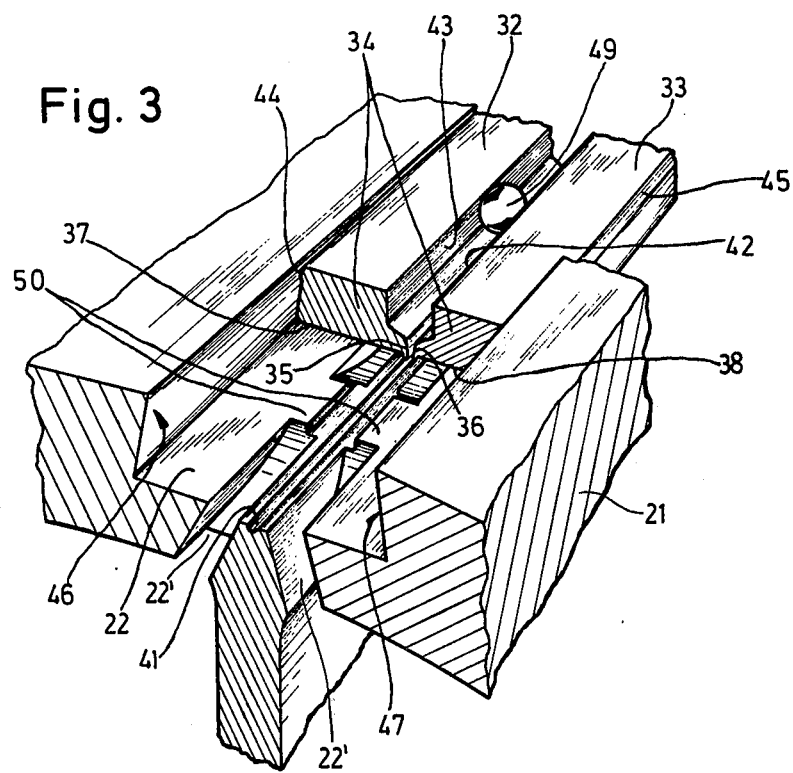
FIG. 3 illustrates a perspective, partially broken away view of one embodiment of a separation nozzle according to the invention, wherein two separation elements are held in position in a holding body forming part of the nozzle construction.

FIG. 2 illustrates a tool 20 for the finish machining of a nozzle, body 21. The nozzle body 21 is rigidly clamped in position by support means not shown. A premachined dovetail groove 22 extends longitudinally in one surface of the body 21. Gas flow passages 22' extend with their opening ends into the dovetail groove 22. A high precision machining of the flanks 46, 47 of the dovetail groove and of a deflection groove 41 in the bottom of the dovetail groove, as best seen in FIG. 3, is accomplished by means of said tool 20, which is pulled by a force Z in the direction of the respective arrow. In the alternative, it is possible to keep the tool 20 stationary and move the nozzle body 21, for example, as shown in FIG. 1.

The tool 20 comprises a longitudinal carrier body 20' having secured thereto guide members 25 and 26. These guide members are adjustable in their spacing from each other, for example, by cam pins 25' and 26', whereby it is possible to control the pressure with which the guide members 25, 26 bear against the side walls or flanks of the dovetail groove. A further set of guide pieces 27 is secured to the rear end of the carrier body 20' in the same manner as the guide member 25, 26. The forward and rear guide members are spaced from each other so as to provide room for a broaching tool 24, which performs a high precision machining of the flanks of the dovetail groove 22 when the body 21 and the tool 20 are moved relative to each other in the longitudinal direction. The dimension of the broaching tool 24 is such, that a high precision material removing shaving or planing operation is performed. The broaching tool 24 is secured to the carrier body 20' by nut and bolt means 28, whereby the tool 24 may be exchanged by another material removing tool for the machining of the deflection groove 41, as seen in FIG. 3. In an alternative embodiment, the material removing tool tip for the formation of the deflection groove may be arranged behind the broaching tool 24 so that the precision machining of the flanks 46, 47 of the dovetail groove and the forming of the deflection groove 41 may be done simultaneously.

Further, measuring sensors, such as shown in FIG. 1, may also be employed in connection with the embodiment of FIG. 2. Such sensing means would control the spacing of the two halves of the broaching tool 24 from each other so as to maintain the precise dimension of the groove width. Similarly, temperature controlled lubrication means such as shown at 13 in FIG. 1 may also be employed in FIG. 2.

FIG. 3 illustrates a perspective, broken-away view of the holding body 21 into which a pair of two rod shaped separation elements 32 and 33 have been inserted. These separation elements 32 and 33 have been machined as described above, with reference to FIG. 1 and have a substantially trapezoidal cross section 34. Lips 35 and 36 extend downwardly from the supported surfaces 37 and 38 of the separation elements 32, 33. The lower tips of lips 35, 36 form nozzle edges 39 and 40 as best seen in the enlarged scale illustration of FIG. 4. The nozzle edges 39, 40 extend into the deflection groove 41.

The edges of the separation elements 32, 33 opposite the lips 35, 36 are machined away so as to form steps 42' and 43' as well as substantially vertical surfaces 42 and 43 which face each other to form a gap between the separation elements 32, 33. The surfaces 42, 43 extend substantially at a right angle to the supported surfaces 37, 38. A ridge 44 is formed along the surface of the separation element 32 which faces the dovetail groove flank 46. Similarly, a ridge 45 is formed along the surface of the separation element 33, which faces the dovetail groove flank 47. These ridges 44, 45 provide a positive contact with the respective flanks 46 and 47. If desired, several ridges may be formed to contact the flank 46, 47 of the dovetail groove 22 in the holding body 21.

The just described features illustrated in FIG. 3 assure a high precision mounting and holding of the separation elements 32 and 33 in the dovetail groove 22, whereby the maintaining of the nozzle geometry as best seen in FIG. 4 is assured due to the insertion of wedging pieces 49 into the gap formed between the walls 42 and 43. The wedging pieces 49 have preferably such a shape, that their pressure contact areas with the walls 42, 43 are located substantially opposite the ridges 44 and 45. This feature has the advantage that any deformation of the nozzle geometry is prevented. The gas flow passages 22' are spaced from each other by lands 50 as shown in FIG. 3 and the wedging pieces 49 are preferably located in the area of these lands 50. The wedging pieces 4 are preferably shaped as balls or spheres of steel. The spacing of these steel balls 49 from the deflection groove 41 and from the nozzle edges 39, 40 is large enough so that the flow conditions in the nozzle are not disturbed. The just described nozzle construction with the steel balls or wedging pieces 49 has the further advantage that individual separation elements 32, 33 may easily be removed and exchanged by other separation elements, whereby the maintenance is substantially facilitated and accordingly the maintenance costs are reduced. In addition, this feature reduces the production costs of such separation nozzle plants.

Figure 5:
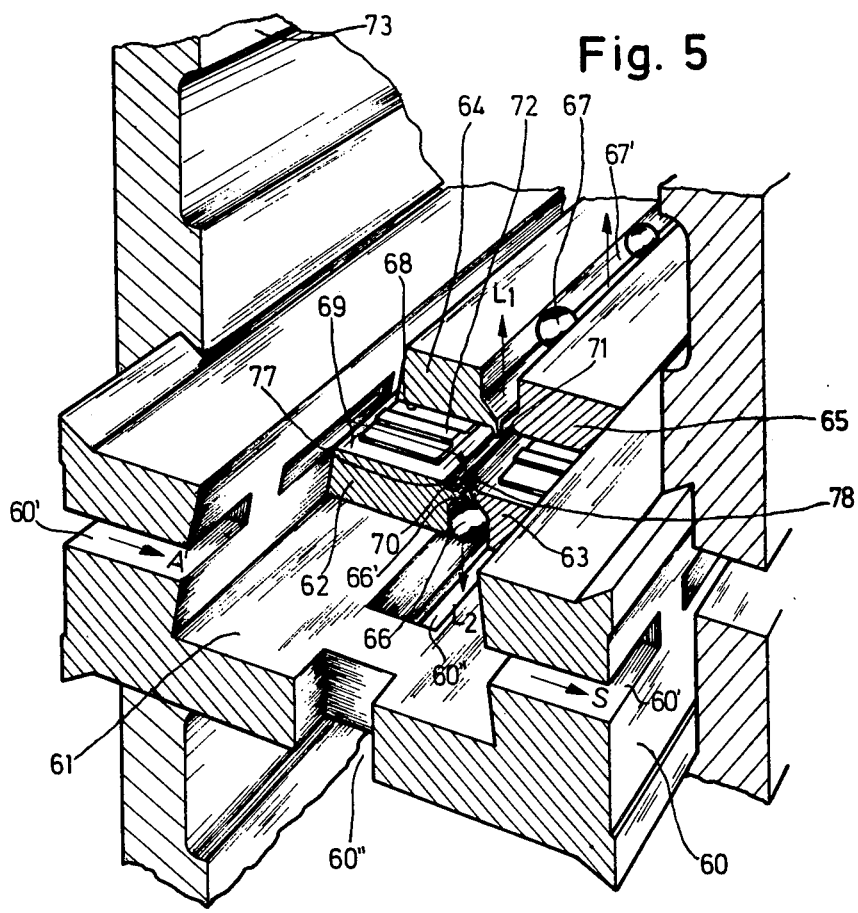
FIG. 5 illustrates a view similar to that of FIG. 3, however showing a modified embodiment of a nozzle according to the invention in which four separation elements are employed to form a double deflection path.
Figure 6:
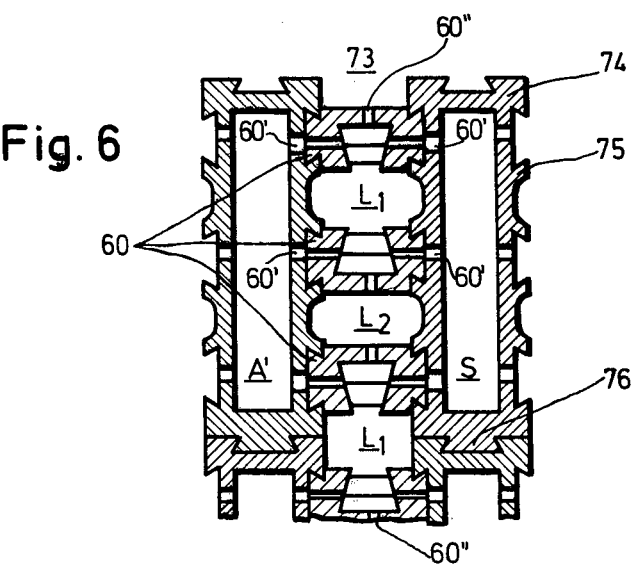
FIG. 6 is a sectional view through an integral structure comprising a plurality of nozzles as illustrated in FIG. 5.

FIGS. 5 and 6 illustrate another embodiment of a separation nozzle arrangment produced according to the method of the invention. A nozzle holding body 60 is provided with a dovetail groove 61, which is deeper than the respective groove in the embodiment of FIG. 3. The groove 61 is deep enough to receive two pairs of sectional rods or separation elements 62 and 63, as well as 64 and 65. These rods are formed in the same manner as described above, and are held in postion by wedging balls 66, 67. However, the separation elements 62 and 65 differ somewhat from the separation elements 63 and 64 in that the separation elements 62 and 65 comprise in addition to the nozzle lips deflection grooves 70 and 71 running alongside of the respective lip. Thus, the deflection groove 70 is formed in the upwardly facing surface 69 of the separation element 62, whereby the surface 69 faces the supported surface 68 of the separation element 64. On the other hand, the deflection groove 71 is arranged in the downwardly facing surface of the separation element 65. The projecting lips are dimensioned in such a manner that the just described deflection grooves 70 and 71 are laterally spaced from each other so that the nozzle edges of the upper pair of elements 64, 65 extend into the groove 70 of the lower pair of elements 62, 63 and vice versa. Spacers 72 with ridges are located between the upper and lower elements 64 and 62 respectively, as well as between the upper and lower elements 65 and 63 respectively. These spacers 72 provide gas passages between the deflection elements which passages provide a gas flow communication between the gas flow passages 60' through the holding body 60 and the deflection grooves 70, 71 as well as the further passages 60'' and the gaps 66', as well as 67'.

The just described embodiment of FIG. 5 achieves a so-called after separation of the heavier fraction of the gas to be separated in such a manner that the now produced second light fraction has substantially a starting concentration so that it may be mixed without loss with the starting gas. The actual separation effect, which is characterized by the shift in the isotope concentration, is measured between the first light fraction L1 and the heavy fraction S. The first light fraction L1 passes through the gap 67' into a respective chamber. The second light fraction L2 passes through the passage 62' into a respective chamber, as illustrated in FIG. 6. The heavy fraction S passes into a respective chamber through the passage 60'. As shown in FIG. 6 the starting gases contained in a chamber A' and flows also through a passage 60' as shown in FIG. 5.

Referring to FIG. 6, the nozzle holding body 60 may be provided with assembly elements such as further dovetail grooves and tongues for insertion into a structural unit 73, preferably in alternate fashion so that the chambers for the first and second light fractions L1, L2 will alternate with each other. Stated differently, the holding bodies 60, three of which are shown in FIG. 6, for example, are of identical construction but by turning them alternately about 180° the integral assembly shown in FIG. 6 may be accomplished. The integral assembly 73 in turn may be provided with additional assembly elements such as dovetail tongues 74, 75 and dovetail grooves 76 for combination with further structural units.

The advantages described above with reference to FIGS. 3 and 4 apply equally in connection with the embodiment illustrated in FIGS. 5 and 6. In addition, the embodiment of FIGS. 5 and 6 results in a compact construction permitting the combination of a large number of inserts into an integral structure. The groves 70, 71 may, for example, be formed by a tool as described with reference to FIG. 2. In both embodiments, it is a substantial advantage of the invention that any defective separation elements may be easily removed and replaced by simply sliding them out of their respective dovetail grooves. Such exchange may, for example, become necessary after a test has a negative result or when transportation damages should have resulted. The embodiment of FIGS. 5 and 6 has the added advantage that the double deflection due to the grooves 70, 71 increases the separation effect. Incidentally, the spacers 72 could be formed separately or they may be machined as an integral part of one or the other separation element or rod.

Although the invention has been described with reference to specific example embodiments, it is to be understood, that it is intended to cover all modifications and equivalents within the scope of the appended claims.

What is claimed is:

1. A method of producing gas separation nozzles for separating gases or vapors having different molecular weights from each other, comprising the steps of shaping a pair of sectional rods by pulling said rods along a high precision sliding track while pressing the rods against the track, and while removing material from the rods to form a pair of rod shaped separation elements having a projecting lip extending therealong, nozzle edges along said lip and vertically extending surfaces substantially opposite said lip, machining a holding body to form a dovetail groove therein and a deflection groove extending from the bottom of the dovetail groove, providing gas flow passages through said holding body to said deflection groove, assembling said pair of separation elements in said dovetail groove with their vertically extending surfaces facing each other to form a gap and their nozzle edges extending into said deflection groove, and inserting wedging pieces into said gap to press said separation elements away from one another and against the respective side of said dovetail groove.

2. The method according to claim 1, wherein said pair of separation elements are assembled in said dovetail groove to extend in mirror symmetrical fashion to each other.

3. A method for producing gas separation nozzles for separating gases or vapors having different molecular weights from each other, comprising the steps of preliminarily shaping material to form sectional rods, supporting and advancing such sectional rods along a high precision sliding track, applying pressure at predetermined locations to two different sides of said advancing rods whereby respective opposite sides of said rods are pressed against said high precision sliding track, and applying a shaving, material removing tool to said advancing rods substantially adjacent to said pressure applying locations to form rod shaped separation elements having a projecting separation lip extending along said rods, machining a holding body to produce a dovetail groove in said holding body adapted to receive a plurality of said rod shaped separation elements, machining gas flow passages through said body, machining a deflection groove in certain separation elements alongside the respective lip, arranging two pairs of separation elements in said dovetail groove whereby each pair comprises a separation element with a deflection groove and a separation element without a deflection groove, said pairs of deflection elements facing each other so that the lips of each pair reach into the deflection groove of the respective opposite pair, and providing gas passages between said separation elements in communication with said gas flow passages in said holding body, said gas flow passages between said separation elements being formed by providing spacers which vertically space two separation elements from each other, by providing gaps between horizontally spaced separation elements, and by inserting wedging pieces into said gaps.

4. The method according to claim 3, further comprising providing said holding body with assembly means, and assemblying a plurality of such holding bodies into a structural unit.

5. A method of producing a gas separation nozzle for separating gases or vapors having different molecular weights from each other, comprising the steps of preliminarily shaping material to form sectional rods, supporting and advancing said sectional rods along a high precision sliding track, applying pressure at predetermined locations to two different sides of said advancing rods whereby respective opposite sides of said rods are pressed against said high precision sliding track, and applying a shaving, material removing tool to said advancing rods substantially adjacent to said pressure applying locations to form rod shaped separation elements having a projecting separation lip extending along said rods, forming a nozzle edge along said lip, forming an outwardly projecting ridge along a side of said rod shaped separation elements, providing said rod shaped separation elements with a substantially vertically extending surface substantially opposite said lip, machining a holding body to produce a dovetail groove in said holding body adapted to receive a number of said separation elements, machining a deflection groove extending from said dovetail groove, providing gas flow passages through said holding body to said deflection groove, inserting a pair of such rod shaped separation elements into said dovetail groove, so that the nozzle edges of the pair extend into said deflection groove and so that said vertically extending surfaces of the pair face each other to form a gap therebetween, said ridges being formed on the sides of said rod shaped separating elements which face a respective surface of said dovetail groove, and inserting wedging pieces into said gap so that said elements are pressed away from each other and with their respective ridges against the corresponding surface of the dovetail groove.

6. The method according to claim 5, wherein in said preliminary shaping step a separation element rod is formed having a substantially trapezoidal shape with two prarallel surfaces and two non-parallel surfaces, and supporting at least two of said surfaces on said sliding track.

7. The method according to claim 6, wherein said lip with its nozzle edge projects from one of said supported surfaces of the rod, comprising forming said outwardly extending ridge along the other of said supported surfaces of the rod, and forming a step above said nozzle edge, said step including said vertically extending surface extending substantially at a right angle relative to said one supported surface of the rod.

8. The method according to claim 5, wherein said machining is performed with such a tool that the dovetail groove and the deflection groove are finish machined simultaneously.

9. The method according to claim 5, wherein said machining is performed with such tools that the dovetail groove and the deflection groove are finish machined separately.

10. The method according to claim 5, wherein said wedging pieces are shaped so as to produce pressure zones extending substantially through each ridge.

11. The method according to claim 10, wherein said wedging pieces are shaped from steel as spheres.

* * * * *

UNITED STATES PATENT OFFICE
CERTIFICATE OF CORRECTION

Patent No. 4,033,021      Dated July 5, 1977

Inventor(s) Gerd Tybus, et al.

It is certified that error appears in the above-identified patent and that said Letters Patent are hereby corrected as shown below:

In the cover sheet, Item [75] correct the spelling of the name of the inventor to read
-- Rudolf Waldhoer --.

Column 8, line 67, "claim 6" should read -- claim 5 --.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*